United States Patent [19]
Kachi et al.

[11] Patent Number: 5,259,818
[45] Date of Patent: Nov. 9, 1993

[54] STROKE ABSORBING TYPE INTERMEDIATE SHAFT FOR VEHICULAR STEERING COLUMN AND METHOD FOR ASSEMBLING THE SAME

[75] Inventors: Shogo Kachi; Shigeru Saitoh, both of Shizuoka; Naoki Yuzuriha, Kanagawa; Hideya Yamashita, Kanagawa; Satoshi Osawa, Kanagawa, all of Japan

[73] Assignees: Fuji Kiko Company, Limited; Nissan Motor Company, Limited, both of Japan

[21] Appl. No.: 507,574

[22] Filed: Apr. 11, 1990

[30] Foreign Application Priority Data

| Apr. 14, 1989 | [JP] | Japan | 1-43957[U] |
|---|---|---|---|
| May 22, 1989 | [JP] | Japan | 1-59030[U] |
| May 22, 1989 | [JP] | Japan | 1-128190 |
| Sep. 28, 1989 | [JP] | Japan | 1-113825[U] |

[51] Int. Cl.$^5$ .................. B62D 1/19; F16C 3/03; F16D 3/76
[52] U.S. Cl. .................. 464/89; 74/492; 280/777; 464/162; 464/180
[58] Field of Search .......... 464/89, 162, 180; 74/492; 280/777

[56] References Cited

U.S. PATENT DOCUMENTS

| 2,956,187 | 10/1960 | Wood | 464/89 X |
|---|---|---|---|
| 3,112,627 | 12/1963 | Gissel | 464/162 |
| 4,098,141 | 7/1978 | Yamaguchi | 74/492 |
| 4,183,258 | 1/1980 | Stephan | 74/492 |
| 4,269,043 | 5/1981 | Kizu et al. | 74/492 X |
| 4,479,786 | 10/1984 | De Bisschop | 74/492 X |
| 4,548,591 | 10/1985 | Holdric et al. | 464/180 X |

FOREIGN PATENT DOCUMENTS

| 1530971 | 8/1970 | Fed. Rep. of Germany . |
|---|---|---|
| 3524504 | 8/1986 | Fed. Rep. of Germany . |
| 2149144 | 3/1973 | France . |
| 2374544 | 7/1978 | France . |
| 2544816 | 10/1984 | France . |
| 2556429 | 6/1985 | France . |
| 53-91236 | 8/1978 | Japan . |
| 59-29147 | 8/1984 | Japan . |
| 61-12876 | 1/1986 | Japan . |
| 61-12877 | 1/1986 | Japan . |
| 1126071 | 9/1968 | United Kingdom . |
| 1395320 | 5/1975 | United Kingdom . |
| 1591527 | 6/1981 | United Kingdom . |
| 2070737 | 9/1981 | United Kingdom .......... 464/89 |

*Primary Examiner*—Daniel P. Stodola
*Assistant Examiner*—William G. Battista, Jr.
*Attorney, Agent, or Firm*—Ronald P. Kananen

[57] ABSTRACT

An intermediate shaft comprising a shaft body including an axle portion and a portion having an approximately elliptic shape of cross section, both major and minor axes of the elliptical cross-section portion being longer than a diameter of the axle portion, and a ring-shaped member with a cross-sectional shape analogous to the elliptic cross-section portion. A method for assembling this shaft provides for a vibration damping member intervened between the housing member and elliptic cross-section portion for damping vibrations transmitted from the steering gear box. This method also ensures that the housing and the vibration damping members and the elliptic cross-section portion are fitted into an outer tubular envelope, and the ring-shaped member normally has a gap against the outer tubular envelope and transmits rotational torque from the outer tubular envelope to the elliptic cross-section portion when the ring-shaped member is contacted with the outer tubular envelope. A universal joint yoke portion is linked to the outer tubular envelope so as to face opposing ends of the housing and vibration damping members and is contactable against the ends of the housing and vibration damping members. A stopper member is extended from the end edge of the outer tubular envelope so as to prevent the ring-shaped member from coming out of the elliptic cross-section portion.

26 Claims, 10 Drawing Sheets

STROKE ABSORBING TYPE INTERMEDIATE SHAFT FOR VEHICULAR STEERING COLUMN AND METHOD FOR ASSEMBLING THE SAME

BACKGROUND OF THE INVENTION (1) Field of the Invention

The present invention relates to a structure for a stroke (shock energy) absorbing type intermediate shaft for a vehicular steering column and a method for assembling the same.

(2) Background of the Art

A steering column installed in a vehicle is generally linked to a steering gear box via an intermediate shaft. The intermediate shaft is linked with a universal joint and located at a lower end portion of a steering shaft axially attached to an upper end of a steering wheel. Then, when the vehicle collides with an obstacle at its front portion, the steering gear box is retracted toward the rear of the vehicle to press up the intermediate shaft. If the linked steering shaft is pressed upward, a danger that the vehicle driver will be tightly pressed against the steering wheel is present. The intermediate shaft, therefore, needs to be contractible and to be of a, so called, stroke absorbing type so that a displacement of a steering gear box does not transmit force in an axial direction of the steering shaft.

To meet such demand, the intermediate shaft includes a tubular portion having an approximately elliptic cross section, i.e., parallel straight sides and semi-circular sides in cross section, the tubular portion being linked with a yoke portion constituting the universal joint, and a shaft having a portion fitted into the tubular portion. The portion of the shaft is tightly fitted into the tubular portion via an anti-vibration member made of, e.g., rubber in order to absorb or buffer transmission of vibrations or sounds generated during vehicle operational from the steering gear box.

In the intermediate shaft, the portion of the shaft is contractibly fitted into the tubular portion in its axial direction, and a rotational force rotating the steering shaft with its axis as a center can be transmitted from the tubular portion to the shaft.

Such a structure of the intermediate shaft as described above is exemplified by Japanese Utility Model Registration Application First Publication Showa 61-12876 published on Jan. 25, 1986 and Japanese Utility Model Registration Application First Publication Showa 61-12877 published on the same date.

Another structure of the intermediate shaft has been proposed in a Japanese Patent Application First Publication Showa 53-91236 published on Aug. 10, 1978.

In the other structure of the previously proposed intermediate shaft disclosed in the above-identified Japanese Patent Application First publication, the intermediate shaft includes a shaft tube coaxially fitted into an outer tube portion linked with a lower end of the steering shaft via an elastic member. A shaft body of the intermediate shaft is coaxially fitted into the shaft tube via a groove inscribed on an inner peripheral surface of the shaft tube and via an adhesive. Axial recesses are cut out so as to face each other at one end of the outer tube portion in a radial direction of the outer tube portion. Stoppers engaging the recesses are fitted to the shaft tube, and the other end portion of the outer tube is formed with a joint.

Another structure of an intermediate shaft has been proposed in a Japanese Utility Model Registration Application Second Publication Showa 59-29147 published on Aug. 22, 1984. The structure of the intermediate shaft disclosed in the above-identified Japanese Utility Model Registration Application Second Publication is substantially similar to those disclosed in the above-identified Japanese Utility Model Registration Application First Publications.

Furthermore, still another structure of the previously proposed intermediate shaft includes a yoke portion linked to another yoke portion fixed to the lower end of the steering shaft. A hollow tube having a circular cross section is linked with the yoke portion, and a stretch forming portion is formed in the vicinity of a linked portion between the hollow tube and yoke portion. The intermediate shaft further includes a shaft body having one end formed with an axle portion and the other end formed with a serration to link with the steering gear box. The shaft body is inserted into the hollow tube portion under pressure. The axle portion is provided with a tip having an analogous cross section to the stretch forming portion, and a buffer member such as a rubber member is fixed onto an outer peripheral surface of the axle portion. An inner tube is attached onto an outer peripheral surface of the buffer member. The buffer member is vulcanized and adhered (by baking) to the axle portion and inner tube. Hence, the intermediate shaft described above provides torsion for the hollow tube when the hollow tube is rotated and the buffer member is accordingly rotated and transmits the rotational force to the axle portion while providing shearing force for the buffer member.

When a strong rotational force is applied to the hollow tube, the force is transmitted to the shaft body and the tip of the hollow tube directly connected with the stretch forming portion. Since the buffer member intervenes between the axle portion and hollow tube, the vibrations and sounds transmitted from the shaft body are absorbed or relieved by means of the buffer member so as to interrupt or relieve transmission of such vibrations to the steering shaft.

However, the previously proposed intermediate shaft structures described above have drawbacks.

That is to say, in the stroke absorbing type intermediate shaft disclosed in the Japanese Utility Model Registration Application First Publications Showa 61-12876 and Showa 61-12877 and the Japanese Patent Utility Model Registration Application Second Publication showa 59-29147, the anti-vibration member is quite thin and, therefore, the torsional spring constant is low. Consequently, a so-called, dead zone (insensitive zone) occurs in the intermediate shaft while the vehicle runs straight at high speeds and steering response characteristic to minor steering adjustments at high speed becomes worsened.

Furthermore, since the anti-vibration (buffer) member is directly inserted into the tube under pressure, stress in the inserted portion against the tube becomes lower so that play occurs in the axial and rotational directions of the intermediate shaft.

In the previously proposed structure of the intermediate shaft disclosed in the Japanese Patent Application First Publication Showa 53-91236, the following problems occur.

(1) Since a structure of fitting stoppers into the shaft tube utilizes a circular form in cross section, the stoppers will rotate themselves with no cooperational rotation if the stoppers are twisted with a large force. This means that under some conditions transmission of steering torque between the tube and shaft tube may not be carried out.

(2) Owing to deterioration of the elastic member and peeling of the adhered portion between the shaft tube and shaft, the stoppers will often draw out of the tube when not tightly fixed thereto.

(3) Since the recesses engaging the stoppers are opened in a single direction, it is necessary to enlarge the thickness of the recesses in order to secure torsional strength of the stoppers. Consequently, workability of the intermediate shaft becomes worsened and the whole weight thereof becomes heavy.

(4) Since the cross sectional form of the elastic member is circular, error easily occurs when inserting the shaft, into the tube shaft and the positioning accuracy of the stoppers thus may easily be compromised.

SUMMARY OF THE INVENTION

It is an object of the present invention to provide an improved structure of an intermediate shaft for a vehicular steering column which can solve the above-described drawbacks.

The above-described object can be achieved by providing a structure for an intermediate shaft located between a steering gear box and the steering shaft of a steering column, comprising: a) a shaft body including an axle portion linked to the steering gear box and a portion having an approximately elliptic shape of cross section, both major and minor axes of the elliptical cross-section portion being longer than a diameter of the axle portion; b) a ring-shaped member having an cross sectional shape analogous to the elliptic cross-section portion; c) a housing member; d) a vibration damping member intervened between the housing member and the elliptic cross-section portion for damping vibrations transmitted from the steering gear box; e) an outer tubular envelope into which the housing and the vibration damping members and the elliptic cross-section portion are fitted, the ring-shaped member normally having a gap against the outer tubular envelope and transmitting rotational torque from the outer tubular envelope to the elliptic cross-section portion when the ring-shaped member is contacted with the outer tubular envelope; f) a universal joint yoke portion linked to the outer tubular envelope so as to face opposing ends of the housing and vibration damping members and being contactable against ends of the housing and vibration damping members; and g) a stopper member extended from the end edge of the outer tubular envelope so as to prevent the ring-shaped member from coming out of the elliptic cross-section portion.

The above-described object can also be achieved by providing a structure of a shaft applicable to a steering column, comprising: a) a rigid body integrally formed with a first body and a second body, the first body having a substantially circular cross section, and one end thereof being linked to a first universal joint yoke portion, and the second body having a substantially elliptic cross section and one end thereof integrally linked to the other end of the first body; b) an outer tubular envelope having a cross section formed analogously to the elliptic cross section of the second body; c) an outer tubular envelope one end of which is linked with a second universal joint yoke portion, having a cross section analogous to the elliptic cross section of the second body, and in which the second body is located, a space being provided between the other end of the second body and a periheral edge of the second universal joint yoke portion; d) a vibration damping member intervened between the outer tubular envelope and second body for damping vibrations transmitted from the second body via the first universal joint yoke portion toward the outer tubular envelope; e) a housing member intervened between the vibration damping member and the outer tubular envelope for enclosing the vibration damping member; and f) first means for preventing displacement of the second body from a position within the outer tubular envelope toward a position outside of the outer tubular envelope, the first means including a ring-shaped member, together with the outer tubular envelope, for transmitting rotational force from the second universal joint yoke portion to the first body when the ring-shaped member is contacted with the outer tubular envelope.

The above-described object can also be achieved by providing a method for assembling an intermediate shaft located between a steering gear box and a steering shaft of a steering column, comprising the steps of: a) forming a shaft body including an axle portion linked to the steering gear box and portion having an approximately elliptic shape of cross section, both major and minor axes of which being longer than a diameter of the axle portion; c) forming a ring-shaped member having a cross-sectional shape analogous to the elliptic cross-section portion; d) providing a housing member; e) intervening a vibration damping member between the housing member and elliptic cross-section portion, the vibration damping member damping vibrations transmitted from the steering gear box; f) fitting the housing and the vibration damping members and the elliptic cross-section portion into an outer tubular envelope, the ring-shaped member normally having a gap against the outer tubular envelope and transmiting a rotational torque from the outer tubular envelope to the elliptic cross-section portion when the ring-shaped member is contacted with the outer tubular envelope; g) linking the outer tubular envelope to a universal joint yoke portion and facing the outer tubular envelope against opposing ends of the housing and vibration damping members, the universal joint yoke portion being contactable against ends of the housing and vibration damping members; and h) forming a stopper member extended from the end edge of the outer tubular envelope so as to prevent the ring-shaped member from separating from the elliptic cross-section portion.

BRIEF DESCRIPTION OF THE DRAWINGS

FIG. 12 (A) is a bottom view of the intermediate shaft shown in FIG. 11.

FIG. 12 (B) is a bottom view of a variation of the intermediate shaft shown in FIGS. 11 and 12 (A).

DETAILED DESCRIPTION OF THE PREFERRED EMBODIMENTS

Reference will hereinafter be made to the drawings in order to facilitate a better understanding of the present invention.

Figure 1:
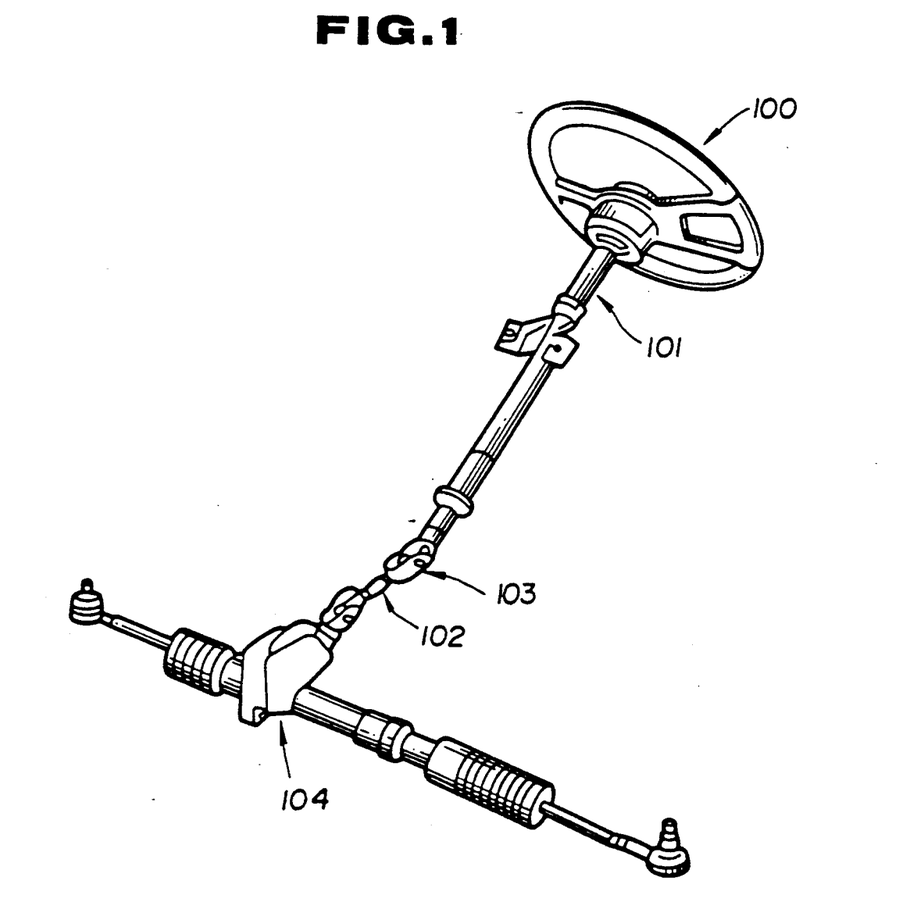
FIG. 1 is a perspective view of a steering system of an automotive vehicle having an intermediate shaft to which the present invention is applicable.

FIG. 1 shows a vehicular steering system having an intermediate shaft to which the present invention is applicable.

As shown in FIG. 1, a steering shaft generally denoted by 101 is axially attached to an end of a steering wheel 100.

The intermediate shaft generally denoted by 102 is linked with a universal joint 103 located at a lower end of the steering shaft 101.

A steering gear box 104 is, furthermore, linked with the intermediate shaft 102.

It is noted that if a vehicle collides with an obstacle at its front portion, the steering gear box 104 is retracted from its normal position toward the steering wheel 100 so as to press the intermediate shaft 102 upward. Since, at this time, a possible danger is present in that a driver may be impinged on the steering wheel 100, the intermediate shaft 102 is required to have a contractible structure and is usually of the, so-called, stroke absorbing type in order not to transmit displacement of the steering gear box 104 in an axial direction of the steering shaft 101.

Figure 2:
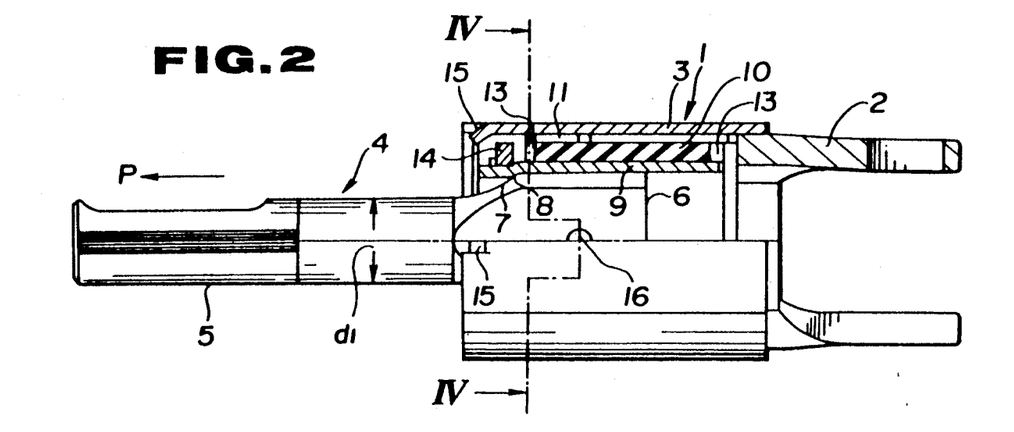
FIG. 2 is a partially cross sectioned right side view of the intermediate shaft in a first preferred embodiment according to the present invention.
Figure 3:
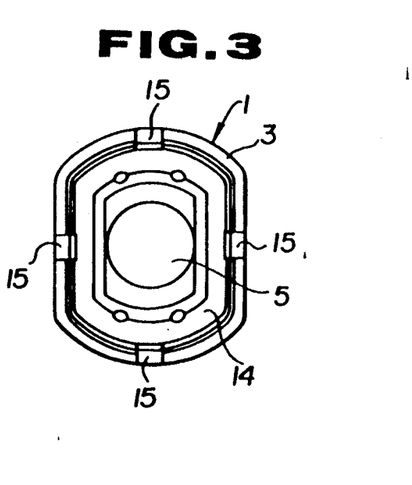
FIG. 3 is a bottom view of the intermediate shaft shown in FIG. 2 viewed from a steering gear box.
Figure 4:
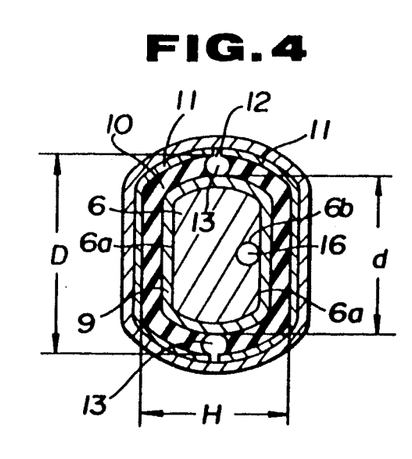
FIG. 4 is a cross sectional view of the intermediate shaft cut way along a line IV—IV of FIG. 2.

FIGS. 2 through 4 show a first preferred embodiment of the intermediate shaft 102 according to the present invention.

As shown in FIGS. 2 and 3, the intermediate shaft 102 includes a tubular portion 1. The tubular portion 1 includes an outer tubular body (envelope) 3 having an approximately elliptic cross section, i.e., having two straight side portions parallel to each other and two semi-circular side portions facing each other. The yoke portion 2 of the universal joint 103 is fitted and fixed into an end of the outer tubular body 3, as typically shown in FIG. 3, by means of a welding process or the like.

The intermediate shaft 102 includes a shaft body 4 integrally formed with its axle portion 5 and its elliptic cross-section portion 6 having a form analogous to the outer tubular body 3.

A ratio of a longer diameter d of an inner tubular body 9 to a diameter $d_1$ of the axle portion 5 is preferably above about 1.5.

A tapered portion 7 is formed on a shoulder of the elliptic cross-section portion 6. The elliptic cross-section portion 6 is fitted into the inner tubular body 9 having a step portion 8 engaged with the tapered portion 7.

An elastic member 10 is vulcanized and adhered to an outer peripheral surface of the inner tubular body 9. The ratio of a longer diameter D to a shorter diameter H of the elastic member 10, shown in FIG. 4, is set to about 1.3 to 1.5. A housing 11 encloses the outer peripheral surface of the elastic member 10. The housing 11 is tightly fitted into the outer tubular body 3 under pressure. The housing 11 is equally divided into two portions, gaps 12, 12 being formed between both divided portions. Hence, as rubber, which is the elastic member 10, is vulcanized and adhered to the inner tubular body 3, sunken portions 13, 13 in the rubber are formed due to the molding shrinkages. The housing 11 may be of a shape similar to the elliptic cross-section portion 6.

A ring 14 is attached onto the step portion 8 of the inner tubular body 9 under pressure. An end edge of the outer tubular body 3 is cut out by a proper width and the remaining projected portions are bent inward to form mutually opposing stoppers (projections) 15 in the radial directions of the outer tubular body 3. Each stopper 15 serves to prevent the ring 14 from coming out of the inner tubular body 9. The stoppers 15 may alternatively be bent vertically or in any arbitrary form such as will prevent separation of the ring 14 and the inner tubular body 9.

A single or a plurality of steel balls (spherical bodies) 16 are intervened between both of or either of sides 6a, 6a of the inner tubular body 9 and elliptic cross-section portion 6. A constant interference is thus given to the inner tubular body 9 so that pressure for the pressurized insertion of the elliptic cross-section portion 6 can be maintained constant. The steel ball 16 is inserted into a hole 6b, as shown in FIG. 4.

The hole 6b is formed in the elliptic cross-section portion 6 which is shallower than the longer diameter of the elliptic cross-section portion 6. A constant interference is provided for the inner tubular body 9 so that the shaft body 4 can be inserted into the inner tubular body 9 under constant pressure in order to prevent easy movement of the shaft body 4 when the vehicle runs normally.

Operation of the first preferred embodiment will be described below.

Rotational torque transmitted from the steering shaft 101 during a usual steering operation is transmitted through the outer tubular body 3 to the housing 11 via the yoke portion 2. The rotational torque is then transmitted from the housing 11 to the inner tubular body 9 via the elastic member 10 and from the elliptic cross-section portion 6 finally to the shaft body 4 via the inner tubular portion 9.

If the rotational torque is large, or if the elastic member 10 is deteriorated or peeled off, the ring 14 contacts the inner peripheral surface of the outer tubular body 3 on a metal-to-metal contact basis.

The stoppers 15 and the ring 14 on the outer tubular body 3 serve integrally to prevent the elliptic portion 6 from coming out at the left in the axial direction (arrow-marked direction P in FIG. 2) when the shaft body 4 is moved in the direction described above.

On the other hand, when a load in the direction fitting the shaft body 4 into the tubular portion 1 under pressure is applied to the shaft body 4, and the inner tubular body 9 is thus contacted with and stopped at the yoke portion 2, the end of the elliptic cross-section portion 6 opposite to the ring 14 invades a space provided in the yoke portion 2.

It is noted that since the housing 11 is equally divided into two portions, a buckling phenomenon of the elastic member 10 will not occur when the shaft body 4 is inserted into the tubular portion 1 under pressure.

Figure 5:
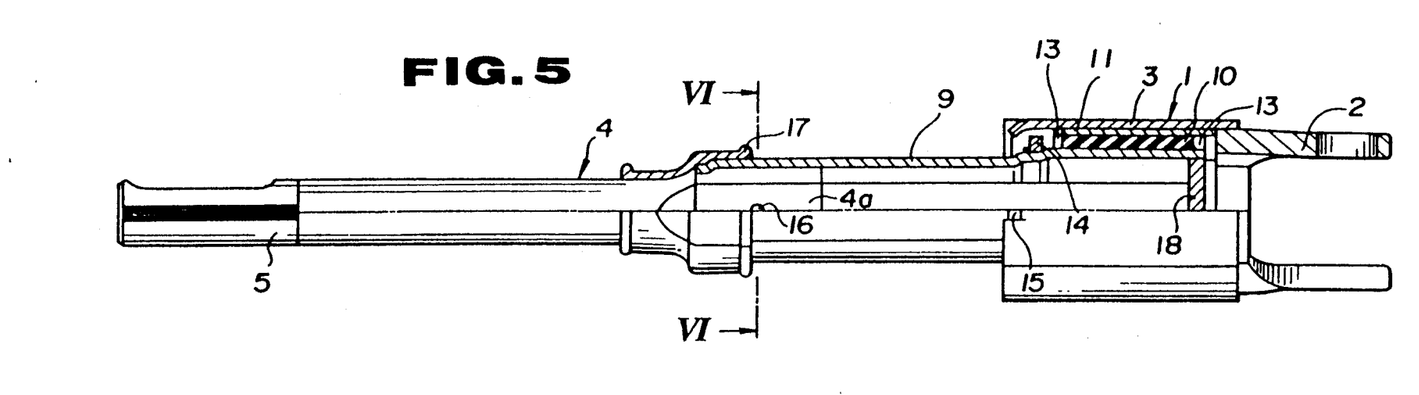
FIG. 5 is a partially cross sectioned right side view of the intermediate shaft in a second preferred embodiment according to the present invention.
Figure 6:
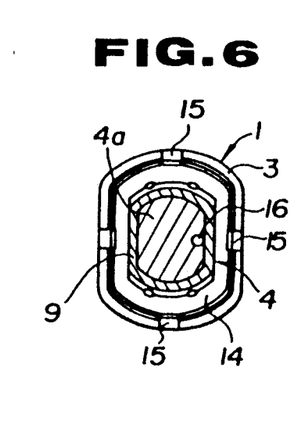
FIG. 6 is a cross sectioned view of the intermediate shaft cut away along a line VI—VI of FIG. 5.

FIGS. 5 and 6 show a second preferred embodiment of the intermediate shaft 102 according to the present invention.

A main difference of the second preferred embodiment from the first preferred embodiment is that the end of the inner tubular body 9 opposite the yoke portion 2 is extended toward the elongated portion of the shaft body 4 so that the elliptic cross-section portion 4a formed at the extended end of the shaft body 4 is fitted into a correspondingly extended portion of the inner tubular body 9.

Then, the steel ball 16 is arranged on the elliptic cross-section portion 4a in the same way as in the first preferred embodiment. Such a structure as described above is provided with a longer stroke such that the shaft body 4 moves by a constant length in the axial direction of the inner tubular body 9 and the length between the other end of the shaft body 4 and yoke portion 2 is elongated to meet a larger-sized layout requirement.

Reference numeral 17 shown in FIGS. 5 and 6 denotes a cap attached on one end portion of the inner tubular body 9. Numeral 18 denotes a lid body closing the other end portion of the inner tubular body 9. Since the remaining construction of the intermediate shaft is the same as that in the first preferred embodiment, detailed explanation of portions represented by the same reference numerals as in the previous embodiment will be omitted here.

Figure 7:
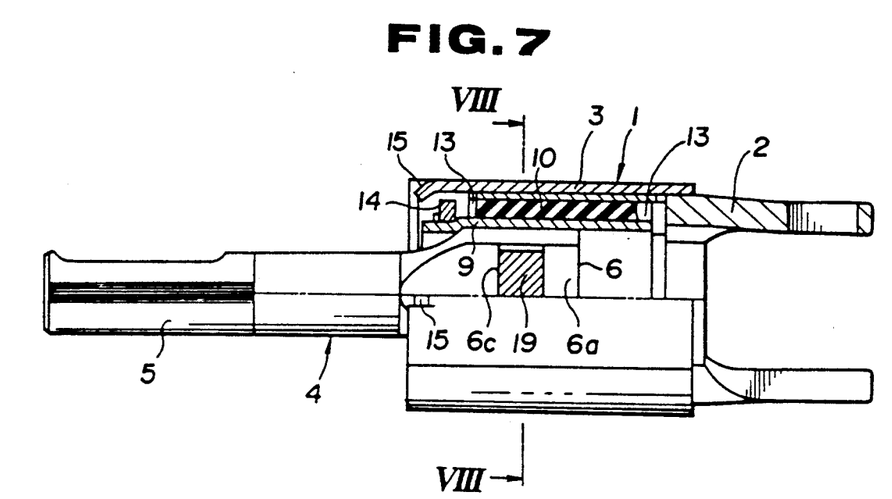
FIG. 7 is a partially cross sectioned right side view of the intermediate shaft in a third preferred embodiment according to the present invention.
Figure 8:
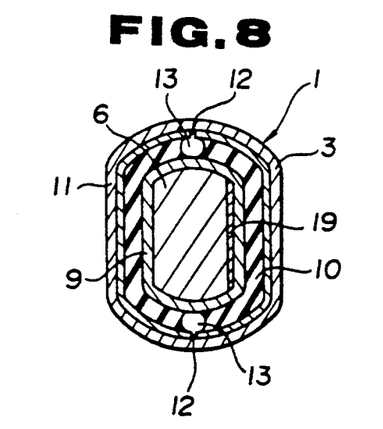
FIG. 8 is a cross sectional view of the intermediate shaft cut away along a line VIII—VIII of FIG. 7.

FIGS. 7 and 8 show a third preferred embodiment of the intermediate shaft 102 according to the present invention.

A difference between the third preferred embodiment and the first preferred embodiment is that a flat plate 19 made of a resin is intervened on either straight side 6a of the elliptic cross-section portion 6 contacted against the inner tubular body 9 in place of the steel ball 16 of the first preferred embodiment. A cut groove (cavity) 6c having a predetermined depth to fit the resin plate 19 into the side 6a is formed on the inner side 6a of the elliptic cross-section portion 6, and the plate 19, which has a thickness slightly larger than the depth of the cut groove 6c, is fitted into the side 6a described above.

Since the remaining construction of the intermediate shaft is the same as that in the first preferred embodiment, detailed explanation of portions represented by the same reference numerals as in the previous embodiments will be omitted here.

Figure 9:
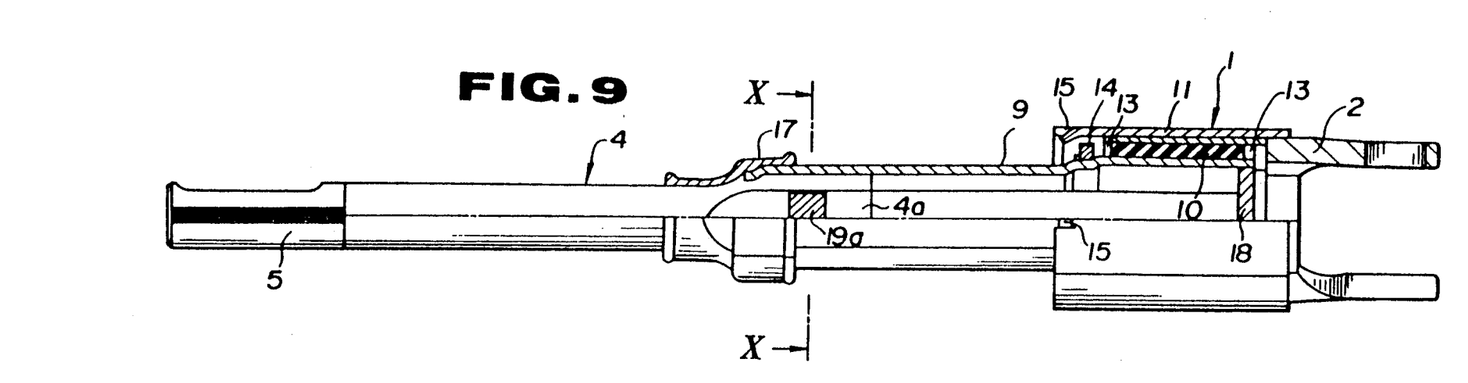
FIG. 9 is a partially cross sectioned right side view of the intermediate shaft in a fourth preferred embodiment according to the present invention.
Figure 10:
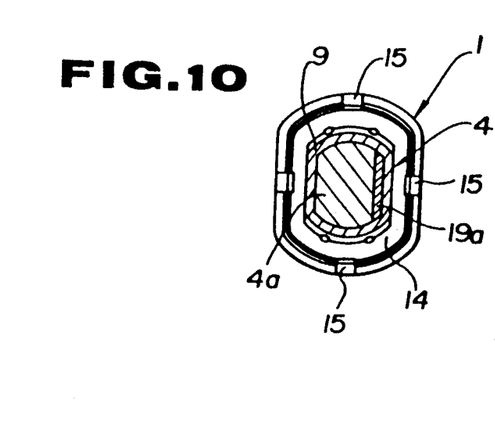
FIG. 10 is a cross sectional view of the intermediate shaft cut away along a line X—X of FIG. 9.

FIGS. 9 and 10 show a fourth preferred embodiment of the intermediate shaft 102 according to the present invention.

In the fourth preferred embodiment, a resin plate 19a is intervened between the elliptic cross-section portion 4a of the extended shaft body 4 and extended inner tubular body 9 in place of the steel ball 16 in the second preferred embodiment, in the same way as in the third preferred embodiment.

Since the other constructions of the fourth preferred embodiment are the same as those in the second preferred embodiment, detailed description of the corresponding elements will be omitted here.

Figure 11:
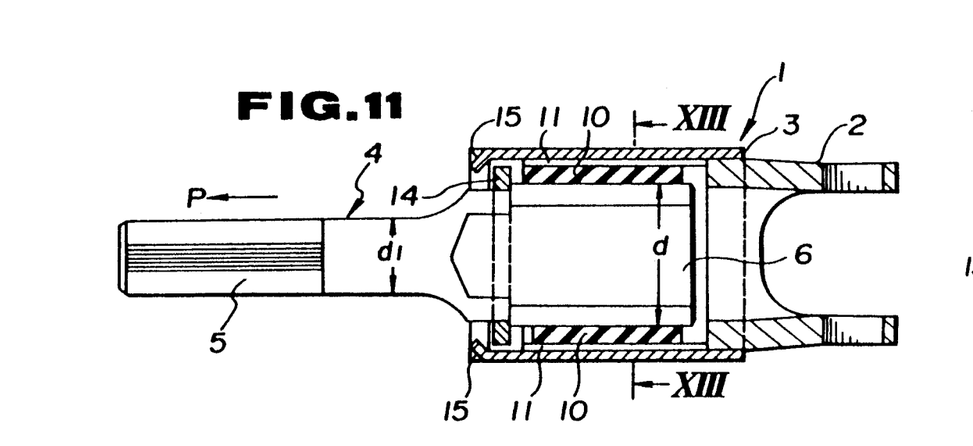
FIG. 11 is a partially cross sectioned right side view of the intermediate shaft in a fifth preferred embodiment according to the present invention.
Figure 12A:
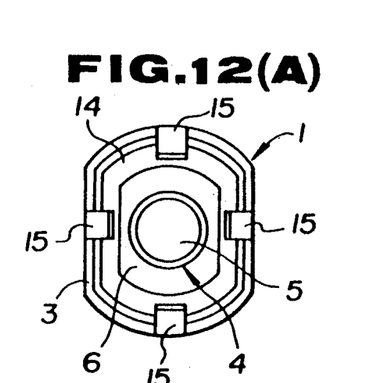
Figure 12B:
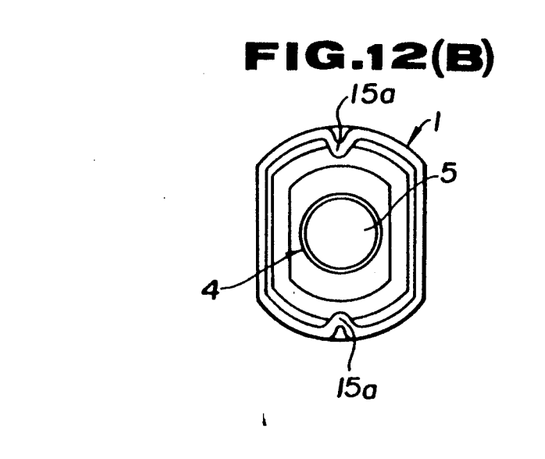
Figure 13:
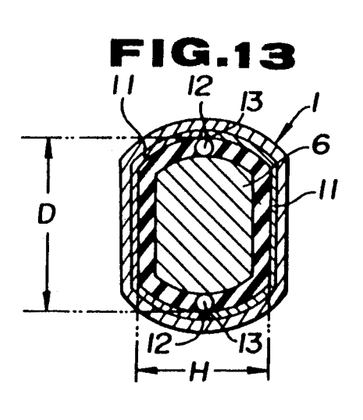
FIG. 13 is a cross sectional view of the intermediate shaft cut away along a line XIII—XIII of FIG. 11.

FIGS. 11 through 13 show a fifth preferred embodiment of the intermediate shaft 102 according to the present invention.

As shown in FIGS. 11 through 13, the tubular portion 1 is integrally linked with the yoke portion 2 forming the universal joint, i.e., the end of the outer tubular body 3 enclosing the elliptic cross-section portion 6 integrally fixed to the yoke portion 2.

The axle portion 5 of the shaft body 4 is integrally formed with a large diameter elliptic cross-section portion 6 fittable to the tubular portion 1 in its axial direction. The ratio between a large diameter d of the elliptic cross-section portion 6 and diameter $d_1$ of the axle portion 5 is above about 1.5 as in the first preferred embodiment. In this way, the structures of the tubular portion 1, yoke portion 2, outer tubular body 3, the shaft body 4, and elliptic cross-section portion 6 are approximately the same as in the first preferred embodiment.

On the other hand, in the the fifth preferred embodiment, the ring 14, being slightly spaced from against the tubular portion 1, is directly and tightly attached to the stepped shoulder of the elliptic cross-section portion 6 under pressure. The elastic member 10, in a elliptic cross-sectioned tubular form analogous to the elliptic cross-section portion 6, is vulcanized and adhered to the outer peripheral surface of the elliptic cross-section portion 6.

The elastic member 10 is set in such a way that the ratio between its larger diameter D and its shorter diameter H is in a range from about 1.3 to 1.5.

The housing 11 is fixed to the outer peripheral surface of the elastic member 10. The housing 11 is fitted into the outer tubular body 3 under pressure and is separated into two portions at a center position of a shorter diameter portion of the elastic member 10 as shown in FIG. 13.

In FIG. 13, the sunken portions 13, 13 are generated due to molding shrinkages in the elastic member 10.

An end edge of the outer tubular body 3 is bent against an outer surface of the ring 14, symmetrically with the opposing edge in either or both of the shorter and longer diameter directions as shown in FIGS. 12 (A) to form the stoppers 15, 15 facing against the ring 14. In a variation shown in FIG. 12 (B), each corresponding edge 15a is pressed to form a V-shaped projected stopper 15a.

The movement of the shaft body 4 in its axial left direction (direction denoted by P in FIG. 11) is stopped by means of the stopper 15 (15a) of the outer tubular body 3. The movement of the shaft body 4 n the opposite direction is prevented by the contact of the other end of the elliptic cross-section portion 6 with the inner peripheral edge of the yoke portion 2.

Since the housing 11 is divided into two portions, no buckling phenomenon occurs in the housing 11 when the shaft body 4 is inserted into the outer tubular body 3 under pressure.

Figure 14:
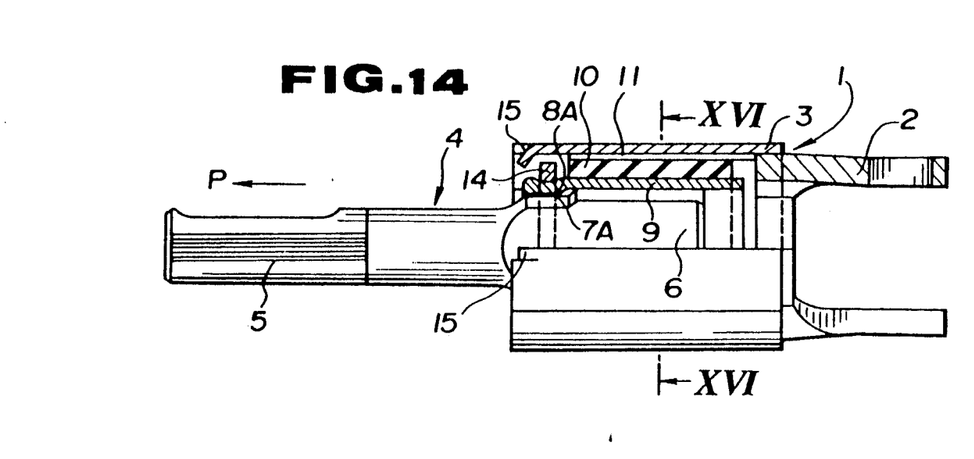
FIG. 14 is a partially cross sectioned right side view of the intermediate shaft in a sixth preferred embodiment according to the present invention.
Figures 15, 16:
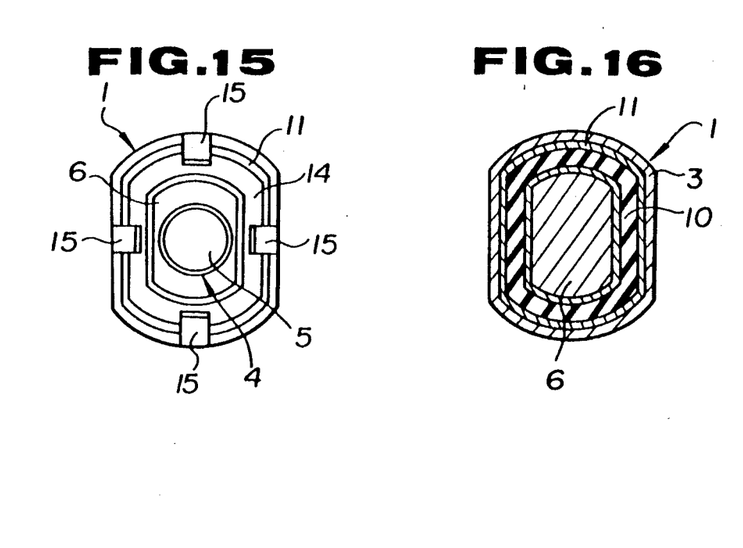
FIG. 15 is a bottom view of the intermediate shaft shown in FIG. 14.
FIG. 16 is a cross sectional view of the intermediate shaft cut away along a line XVI—XVI of FIG. 14.

FIGS. 14 through 16 show a sixth preferred embodiment of the intermediate shaft 102 according to the present invention.

In the sixth preferred embodiment, an L-shaped step (recessed) portion 7A is formed on the shoulder of the elliptic cross-section portion 6, the outer tubular body 3 having the L-shaped step portion 8A as well. The step portion 8A engages the corresponding step portion 7A.

The structure and operation of the intermediate shaft 102 in the sixth preferred embodiment are approximately the same as those of the first preferred embodiment except for the omission of sunken portions, and steel ball.

Figure 17:
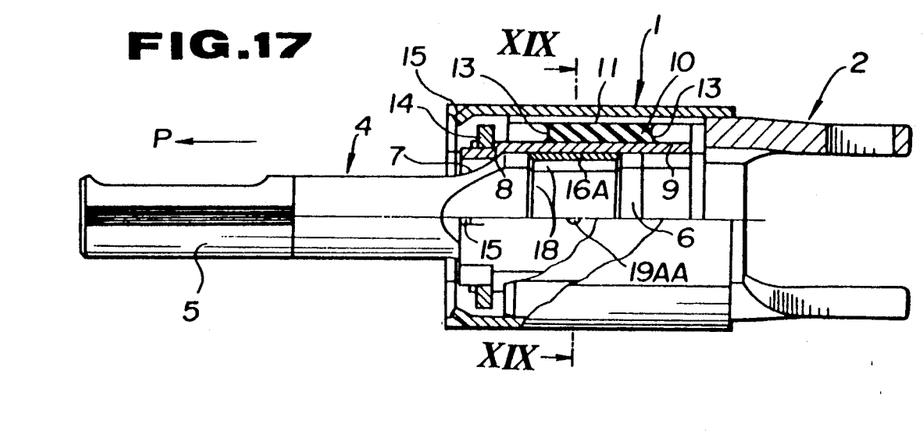
FIG. 17 is a partially cross sectioned right side view of the intermediate shaft in a seventh preferred embodiment according to the present invention.
Figure 18:
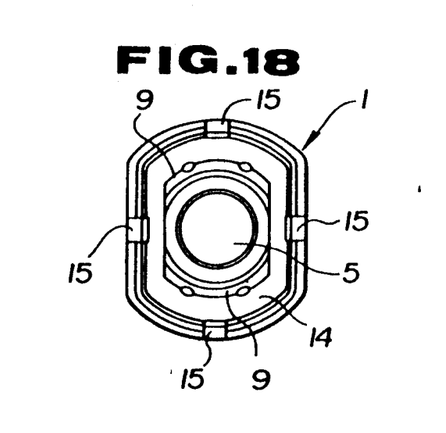
FIG. 18 is a bottom view of the intermediate shaft shown in FIG. 17.
Figure 19:
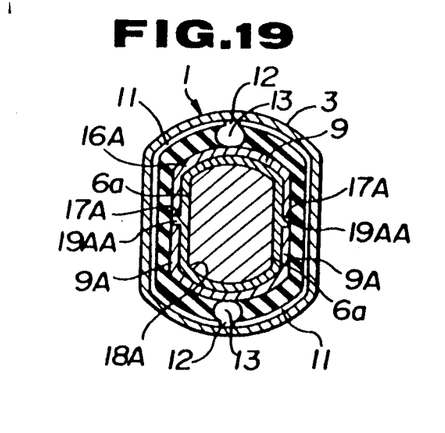
FIG. 19 is a cross sectional view of the intermediate shaft cut away along a line XIX—XIX of FIG. 17.

FIGS. 17 through 19 show a seventh preferred embodiment of the intermediate shaft 102 according to the present invention.

As shown in FIGS. 17 through 19. a ring 16A made of a resin is molded at a portion between the inner tubular body 9 and elliptic cross-section portion 6.

Holes 17A, 17A are penetrated through the straight flat side surface portions 9A, 9A of the inner tubular body 9, respectively. The flat side surfaces 9A, 9A face against the corresponding flat surface portions 6a, 6a of the elliptic cross-section portion 6. During the assembly of the intermediate shaft 102, the elongated groove 18 is formed on an outer peripheral surface of the elliptic cross-section portion 6. The groove 18 is provided with a predetermined depth.

The elliptic cross-section portion 6 is inserted into the inner tubular body 9 so as to face the hole 17A, 17A against the groove 18. A resin is injected through the holes 17A, 17A and hardened as resin pins 19AA, 19AA. Each resin pin 19AA, 19AA is thus formed in the corresponding hole 17A, 17A. Hence, no play is provided between the shaft body 4 and inner tubular body 9. In addition, the axial movement of the shaft body 4 is prevented until the resin pins 19AA, 19AA are sheared. The other constructions of the seventh preferred embodiment are the same as those in the first preferred embodiment.

In the seventh preferred embodiment, even when weight in the direction toward which the elliptic cross-section 6 is inserted under pressure is imposed on the shaft body 4 due to collision of the front body portion of the vehicle against an obstacle, the inner tubular body 9 is moved and then stopped, contacting against the yoke portion 2. The resin pins 19AA, 19AA are sheared, engaging the holes 17A, 17A of the inner tubular body 9. The other end of the elliptic cross-section portion 6 into, then, invades into the yoke portion 2. The axial movement of the shaft body 4 (in the arrow-marked direction P in FIG. 17) is prevented by means of the combination of the ring 14 and the stoppers 15 provided on the outer tubular body 3. In the seventh preferred embodiment, the housing 11 is equally divided into two portions as in the first preferred embodiment, so that a buckling phenomenon in the elastic member 10 does not occur when the shaft body 4 is inserted under pressure into the tubular portion 1.

Furthermore, even if deterioration or peeling off of the elastic member 10 occurs, the shaft body 4 or inner tubular body 9 will not easily be drawn out of the tubular portion 1, and, with the ring 14 contacting the stoppers 15, the transmission of torque becomes possible. In the same way, the inner tubular body 9 will not invade in the yoke portion 2 so that the rotation of the shaft body 4 can be assured with the ring 14 contacted against the outer tubular body 9.

Figure 20:
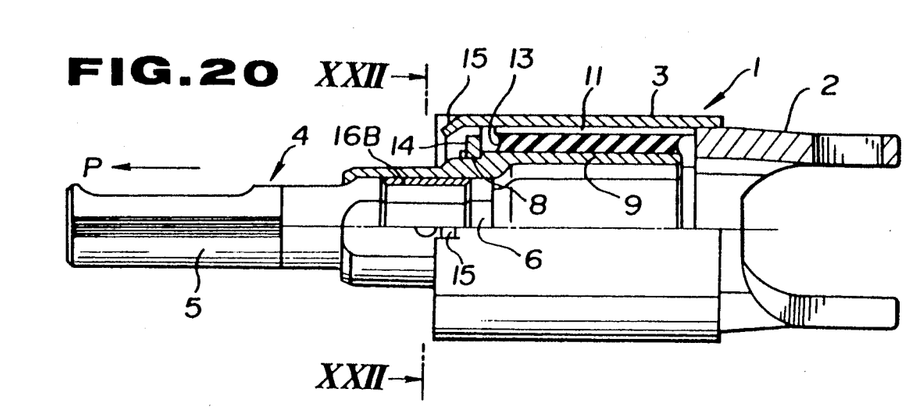
FIG. 20 is a partially cross sectioned right side view of the intermediate shaft in an eighth preferred embodiment according to the present invention.
Figure 21:
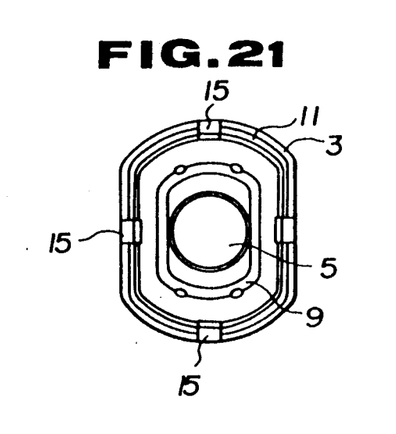
FIG. 21 is a bottom view of the intermediate shaft shown in FIG. 20.
Figure 22:
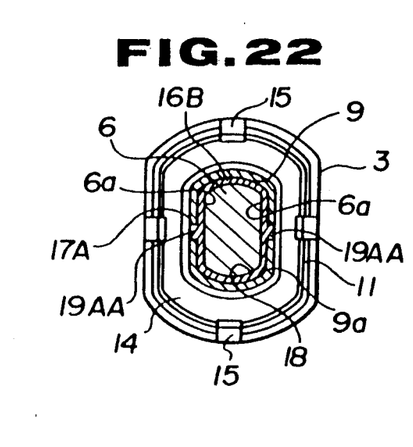
FIG. 22 is a cross sectional view of the intermediate shaft cut away along a line II—II of FIG. 20.

FIGS. 20 through 22 show an eighth preferred embodiment of the intermediate shaft 102 according to the present invention.

In the eighth preferred embodiment, a main difference from the seventh preferred embodiment is that the inner tubular body 9 is elongated and a position at which the body 9 engages the elliptic cross-section portion 6 is located outside of the ring 14 so that both elastic member 10 and resin ring 16B are not overlapped. The remaining construction is the same as in the seventh preferred embodiment, therefore detailed description will be omitted here.

In the eighth preferred embodiment, both resin ring 16B and elastic member 10 do not overlap and are deviated from each other. The thermal process of molding the elastic member 10 in this embodiment will generate less heat than in the previous embodiments, thus less heat will be received by the resin ring 16B. Hence, working time can be shortened and quality control is preferably easy and may be carried out sooner. In addition, cost reduction can be achieved.

Figure 23:
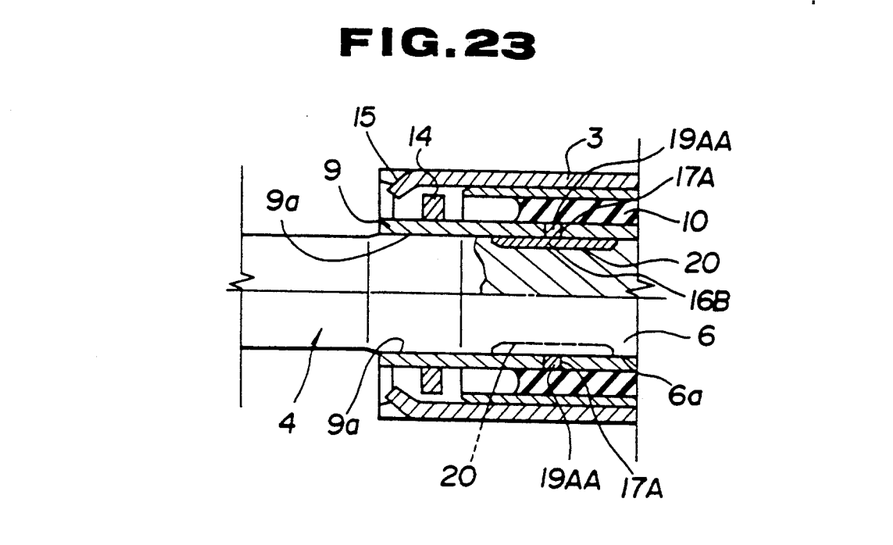
FIG. 23 is a partially cross sectioned right side view of a variation of the intermediate shaft shown in FIGS. 20 through 22.
Figure 24:
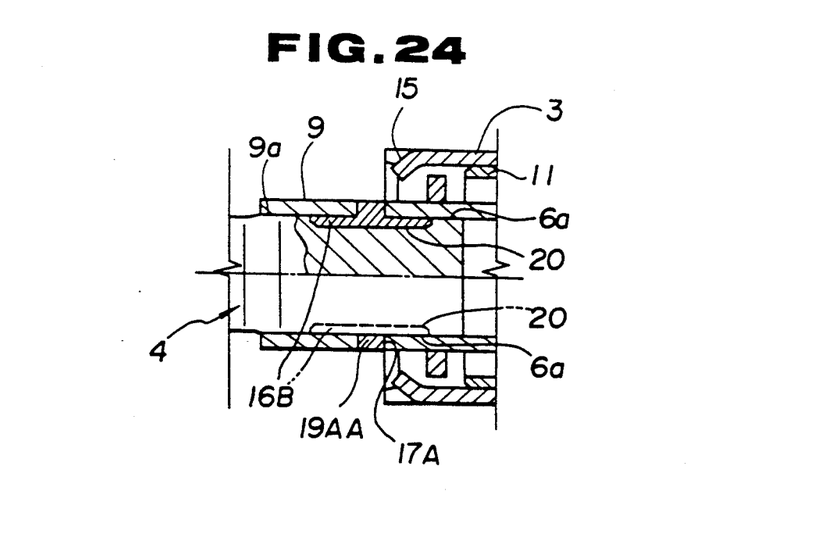
FIG. 24 is a partially cross sectioned right side view of the variation of the intermediate shown in FIGS. 20 through 22.

It is noted that, as shown in FIGS. 23 and 24, in place of the peripheral groove 18, the same recessed portions 20 may, alternatively and respectively, be formed on the flat surface portions 6a, 6a formed on left and right sides of the elliptic cross section 6 and a resin may, alternatively, be injected into and hardened into the recessed portions 20, 20 from the holes 17A, 17A. In FIGS. 23 and 24, 19AA, 19AA denote the resin pins.

As described hereinabove, in the structure of the intermediate shaft and method for assembling the same according to the present invention, the shaft body constituted by the elliptic cross-section portion and axle portion will be displaced into the outer tubular portion if the shaft body is contracted into the outer tubular portion and, thus, no displacement of the steering shaft occurs, when the vehicle collides against an obstacle at its front portion. In a case where stress caused by the inner tubular envelope and shaft body into the outer tubular portion is reduced, the shaft body does not come out of the tubular portion via step portions of the shaft body and inner tubular envelope engaged with each other and transmission of rotational torque is possible. If the elastic member is deteriorated or peeled off, neither the inner tubular body nor the shaft body come out of the outer tubular portion since the ring is contacted with the stoppers and transmission of rotational torque remains possible. In the same case, the inner tubular body is not moved into the universal joint yoke portion. Furthermore, the ring is contacted with the outer tubular portion to secure the rotation of the shaft body.

In addition, since, in the structure of the intermediate shaft and method for assembling the same according to the present invention, the elastic member is fixed around an outer peripheral surface of the elliptic cross-section portion, an appropriate quantity and quality of the elastic member can be fixed onto the outer peripheral surface of the elliptic cross-section portion and, thereby, vehicle noise can be remarkably reduced. Since the cross sectional shape of the elastic member is substantially analogous to that of the elliptic cross-section portion, a higher spring constant of the intermediate shaft can be achieved to contribute to the stability of steering operations.

Furthermore, since the shaft body, i.e., elliptic cross-section portion is fitted into the outer tubular portion, the cross sectional shape of which is analogous to that of the elliptic cross-section portion, a deviation of the shaft body in the rotational direction of the shaft body is reduced and positioning accuracy between the ring and outer tubular body becomes higher. In addition, no play between the shaft body and the inner tubular envelope is incurred.

In the way described above, the intermediate shaft according to the present invention has various beneficial effects not found in the prior art.

It will fully be appreciated by those skilled in the art that the foregoing description has been made in terms of the preferred embodiment and that various changes and modifications may be made in terms of the preferred embodiments without departing from the scope of the present invention which is to be defined by the appended claims.

What is claimed is:

1. A structure of an intermediate shaft located between a gear box and a steering shaft of a steering column, comprising:
   a) a shaft body including an axle portion linked to the steering gear box and a portion having an approximately elliptic shape of cross section comprising two generally planar parallel surfaces interconnected with two arcuate surfaces, both major and minor axes of said elliptical cross-section portion being longer than a diameter of said axle portion;
   b) a ring-shaped member having a cross sectional shape analogous to said elliptic cross-section portion;
   c) a housing member;
   d) a vibration damping member intervened between said housing member and said elliptic cross-section portion for damping vibrations transmitted from said steering gear box;
   e) an outer tubular envelope into which said housing and said vibration damping member and said elliptic cross-section portion are fitted, said ring-shaped member normally being spaced by a gap from said outer tubular envelope and transmitting rotational torque from said outer tubular envelope to said elliptic cross-section portion when said ring-shaped member is contacted with said outer tubular envelope;
   f) a universal joint yoke portion linked to said outer tubular envelope so as to face opposing ends of said housing and vibration damping members and being contactable against ends of said housing and vibration damping member; and
   g) a stopper member extended from the end edge of said outer tubular envelope so as to prevent said ring-shaped member from coming out of said elliptic cross-section portion;

wherein said elliptic cross-section portion has a cross-sectional shape such that two substantially straight sides are parallel to each other and two semi-circular sides are opposite to each other and wherein a length of the major axis of said elliptic cross-section portion is approximately 1.5 times or more the diameter of the axle portion having a circular cross section;
   wherein said outer tubular envelope has one internal end into which said yoke portion is fitted and has the same cross section as said elliptic cross section portion so as to enable insertion of said housing member thereinto under pressure; and
   wherein said elliptic cross-section portion has a step portion, said structure further including an inner tubular envelope intervened between said vibration damping member and said elliptic cross-section portion, said inner tubular envelope having a step portion engaging the step portion of said elliptic cross-section portion, said ring-shaped member being fitted around said inner tubular envelope.

2. A structure of an intermediate shaft as set forth in claim 1, wherein said vibration damping member comprises rubber which is vulcanized and adhered onto a peripheral surface of said elliptic cross-section portion.

3. A structure of an intermediate shaft as set forth in claim 1, wherein said ring-shaped member is directly coaxially fitted around a peripheral surface of said inner tubular envelope.

4. A structure of an intermediate shaft as set forth in claim 3, wherein said housing member is equally divided into two portions with a gap provided between the two portions and wherein said vibration damping member, comprised of rubber, is provided, said rubber having sunken portions and being vulcanized and adhered onto the peripheral surface of said inner tubular envelope.

5. A structure of an intermediate shaft as set forth in claim 4, wherein said stopper member includes a plurality of stoppers symmetrically arranged around the end edge of said outer tubular envelope.

6. A structure of an intermediate shaft as set forth in claim 5, wherein said stopper member includes two stoppers formed by pressing the semi-circular sides of the end edge of said outer tubular envelope inwardly so as to be inclined toward said ring-shaped member.

7. A structure of an intermediate shaft as set forth in claim 6, wherein a ratio of a length of the major axis to a length of the minor axis of said vibration damping member is set in between about 1.3 and 1.5.

8. A structure of an intermediate shaft as set forth in claim 7, wherein at least one steel ball is intervened between one of the two straight sides of said elliptic cross-section portion and a corresponding wall of said inner tubular envelope, said steel ball providing constant pressure against said inner tubular envelope so that a pressure against said elliptic cross-section portion when inserted into said inner tubular envelope under pressure is maintained constant.

9. A structure of an intermediate shaft as set forth in claim 8, wherein one end of said inner tubular envelope is extended and said elliptic cross-section portion is fitted into the extended portion of said inner tubular envelope, sad steel ball being arranged on said elliptic cross-section portion, so that a stroke such that said shaft body can be moved in the axial direction of said inner tubular envelope by a predetermined length is provided and a length between the other end of said shaft body and yoke portion becomes longer.

10. A structure, of an intermediate shaft as set forth in claim 9, wherein at least one plate member made of resin is intervened between one of the two straight sides of said elliptic cross-section portion and a corresponding wall of said inner tubular envelope, and a constant pressure is thus provided to said inner tubular envelope so that a pressure against said elliptic cross-section portion when inserted into said inner tubular envelope under pressure is maintained constant.

11. A structure of an intermediate shaft as set forth in claim 7, wherein at least one plate member made of resin is intervened between one of the two straight sides of said elliptic cross-section portion and a corresponding wall of said inner tubular envelope, and a constant pressure is thus provided to said inner tubular envelope so that a pressure against said elliptic cross-section portion when inserted into said inner tubular envelope under pressure is maintained constant.

12. A structure of an intermediate shaft as set forth in claim 7, wherein a hole is provided through one of the two parallel straight sides of said inner tubular envelope which faces toward the corresponding straight side of said elliptic cross-section portion and a peripheral groove is formed having a predetermined depth around an outer peripheral surface of said elliptic cross-section portion, the hole and peripheral groove facing each other, and a pin made of resin hardened therein through injection of resin through said hole, so that no play between the shaft body and inner tubular envelope is provided and movement of said shaft body in its axial direction is prevented until said resin pin is sheared.

13. A structure of an intermediate shaft as set forth in claim 12, wherein said tubular envelope is extended so that a position at which said elliptic cross-section portion is engaged with said inner tubular envelope is outside of said ring-shaped member and said vibration damping member and resin ring do not overlap each other.

14. A structure of an intermediate shaft as set forth in claim 7, wherein a hole is provided through one of the two parallel straight sides of said inner tubular envelope which faces toward the corresponding straight side of said elliptic cross-section portion, a recess is formed having a predetermined depth around an outer peripheral surface of said elliptic cross-section portion, said hole and recess facing each other, and a pin made of resin hardened through injection of resin through said hole, so that no play between the shaft body and inner tubular envelope is provided and movement of said shaft body in its axial direction is prevented until the resin pin is sheared.

15. A structure e of an intermediate shaft as set forth in claim 7, wherein holes are provided through the two parallel straight sides of said inner tubular envelope which face toward the straight sides of said elliptic cross-section portion, peripheral grooves are formed, each having a predetermined depth around an outer peripheral surface of said elliptic cross-section portion, the holes and peripheral grooves facing each other, and a pin made of resin hardened therein through injection of resin through said holes.

16. A structure of an intermediate shaft as set forth in claim 15, wherein holes are provided through the two parallel straight sides of said inner tubular envelope which face toward the straight sides of said elliptic cross-section portion, recesses are formed, each recess having a predetermined depth around an outer peripheral surface of said elliptic cross-section portion, the holes and recesses facing each other, and pins made of resin hardened therein through injection of resin through said holes, so that no play between the shaft body and inner tubular envelope is provided and movement of the shaft body in its axial direction is prevented until the resin pins are sheared.

17. A structure of a shaft applicable to a steering column, comprising:
   a) a rigid body integrally formed with a first body and a second body, said first body having a substantially circular cross-section, one end of said first body being linked to a first universal joint yoke portion and said second body having a substantially elliptic cross section comprising two generally planar parallel surfaces interconnected with two arcuate surfaces, one end of said second body being integrally linked to the other end of said first body;
   b) an outer tubular envelope one end of which is linked with a second universal joint yoke portion, having a cross section analogous to said elliptic cross section of said second body, and in which said second body is located, a space being provided between the other end of said second body and a peripheral edge of said second universal joint yoke portion;
   c) a vibration damping member intervened between said outer tubular envelope and second body for damping vibrations transmitted from said second body via said first universal joint yoke portion toward said outer tubular envelope;
   d) a housing member intervened between said vibration damping member and said outer tubular envelope for enclosing said vibration damping member; and
   e) first means for preventing displacement of said second body from a position within said outer tubular envelope toward a position outside of said outer tubular envelope, the first means including a ring-shaped member, together with said outer tubular envelope, for transmitting rotational force from said second universal joint yoke portion to said first body when said ring-shaped member is contacted with said outer tubular envelope;
   wherein the ring-shaped member is coaxially fitted around a step portion formed on one end of said second body with a gap normally provided against the inner side of said outer tubular envelope and wherein said first means includes a stopper member formed on the other end of said outer tubular envelope for preventing said ring-shaped member from coming out of said second body by said ring-shaped member contacting said stopper member.

18. A structure of a shaft as set forth in claim 17, wherein said housing member has one end linked with a corresponding end edge of said second universal joint yoke portion and is divided into two portions with gaps provided between the two portions to prevent buckling of said vibration damping member.

19. A structure of a shaft as set forth in claim 18, wherein said vibration damping member comprises a rubber member having sunken portions located at the gaps provided between the two portions of said housing member.

20. A structure of a shaft applicable to a steering column, comprising:

a) a rigid body integrally formed with a first body and a second body, said first body having a substantially circular cross-section, one end of said first body being linked to a first universal joint yoke portion and said second body having a substantially elliptic cross section comprising two generally planar parallel surfaces interconnected with two arcuate surfaces, one end of said second body being integrally linked to the other end of said first body;

b) an outer tubular envelope one end of which is linked with a second universal joint yoke portion, having a cross section analogous to said elliptic cross section of said second body, and in which said second body is located, a space being provided between the other end of said second body and a peripheral edge of said second universal joint yoke portion;

c) a vibration damping member intervened between said outer tubular envelope and second body for damping vibrations transmitted from said second body via said first universal joint yoke portion toward said outer tubular envelope;

d) a housing member intervened between said vibration damping member and said outer tubular envelope for enclosing said vibration damping member; and e) first means for preventing displacement of said second body from a position within said outer tubular envelope toward a position outside of said outer tubular envelope, the first means including a ring-shaped member, together with said outer tubular envelope, for transmitting rotational force from said second universal joint yoke portion to said first body when said ring-shaped member is contacted with said outer tubular envelope;

wherein said housing member has one end linked with a corresponding end edge of said second universal joint yoke portion, said structure further including an inner tubular envelope intervened between the peripheral surface of said second body and vibration damping member, said ring member being fitted around a peripheral surface of a shoulder step portion formed on one end of said inner tubular envelope via a step portion formed on said one end of said second body.

21. A structure of a shaft as set forth in claim 20, which further includes at least one steel spherical body intervened between a side wall of said second body and a corresponding wall of said inner tubular envelope, and a constant interference is provided to said inner tubular envelope so that pressure applied to said second body when it is inserted into said inner tubular envelope under pressure can be maintained constant.

22. A structure of a shaft as set forth in claim 21, wherein said inner tubular envelope is extended so that said second body is fitted into said extended portion of said inner tubular envelope and the space between the other end of said second body and second universal joint yoke portion can be elongated.

23. A structure of a shaft as set forth in claim 20, which further includes at least one plate member made of a resin intervened between a side wall of said second body and a corresponding wall of said inner tubular envelope and a constant interference is provided to said inner tubular envelope so that pressure applied to said second body when it is inserted into said inner tubular envelope under pressure can be maintained constant.

24. A structure of a shaft as set forth in claim 23, wherein said inner tubular envelope is extended so that said second body is fitted into the extended portion of said inner tubular envelope and the space between the other end of said second body and second universal joint yoke portion can be elongated.

25. A structure of a shaft as set forth in claim 20, further includes a recessed groove formed on said second body and a hole formed on a portion of said inner tubular envelope opposing the recessed groove, a resin being injected through the hole and hardened therein to form a resin pin in said recessed groove.

26. A method for assembling an intermediate shaft located between a steering gear box and a steering shaft of a steering column, comprising the steps of:

a) forming a shaft body including an axle portion linked to said steering gear box and a portion having approximately elliptic shape of cross section comprising two generally planar parallel surfaces interconnected with two arcuate surfaces, both major and minor axes of which being longer than a diameter of said axle portion;

b) forming a ring-shaped member having a cross-sectional shape analogous to said elliptic cross-section portion;

c) providing a housing member;

d) intervening a vibration damping member between said housing member and elliptic cross-section portion, said vibration damping member damping vibrations transmitted from said steering gear box;

e) fitting said housing and said vibration damping members and said elliptic cross-section portion into an outer tubular envelope, said ring-shaped member normally having a gap against said outer tubular envelope and transmitting a rotational torque from said outer tubular envelope to said elliptic cross-section portion when said ring-shaped member is contacted with said outer tubular envelope;

f) linking said outer tubular envelope to a universal joint yoke portion and facing said outer tubular envelope against opposing ends of said housing and vibration damping members, said universal joint yoke portion being contactable against ends of said housing and vibration damping members;

g) forming a stopper member extended from the end edge of said outer tubular envelope so as to prevent said ring-shaped member from separating from said elliptic cross-section portion;

wherein said elliptic cross-section portion is formed to have a cross-sectional shape such that two substantially straight sides are parallel to each other and two semi-circular sides are opposite to each other and wherein a length of the major axis of said elliptic cross-section portion is formed to be approximately 1.5 times or more the diameter of the axle portion having a circular cross section;

wherein said outer tubular envelope is formed so that said outer tubular envelope has one internal end into which said yoke portion is fitted and has the same cross section as said elliptic cross section portion so as to enable insertion of said housing member thereinto under pressure; and wherein said elliptic cross-section portion is formed to have a step portion, said method further including a step of intervening an inner tubular envelope between said vibration damping member and said elliptic cross-section portion, said inner tubular envelope having a step portion engaging the step portion of said elliptic cross-section portion, said ring-shaped member being fitted around said inner tubular envelope.

* * * * *